Figure 1:
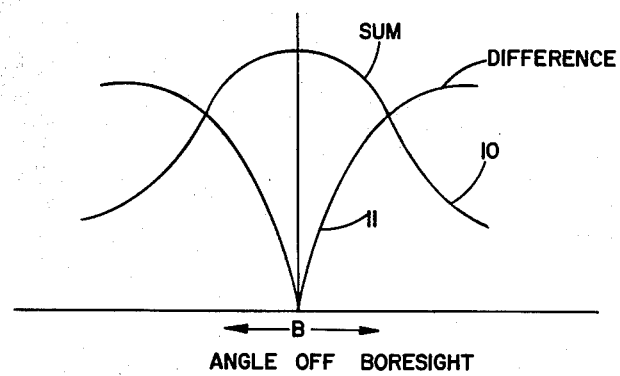

March 24, 1964  R. G. KNUTSON ETAL  3,126,542
CONICAL SCANNING RADAR DATA PROCESSING SYSTEM
Filed Jan. 23, 1962  3 Sheets-Sheet 1

INVENTORS
ROY G. KNUTSON
JAMES C. ELMS
BY
Allen Rothenberg
ATTORNEY

March 24, 1964  R. G. KNUTSON ETAL  3,126,542
CONICAL SCANNING RADAR DATA PROCESSING SYSTEM
Filed Jan. 23, 1962  3 Sheets-Sheet 2

INVENTORS
ROY G. KNUTSON
JAMES C. ELMS
BY Allan Rothenberg
ATTORNEY

INVENTORS
ROY G. KNUTSON
JAMES C. ELM
ATTORNEY

United States Patent Office
3,126,542
Patented Mar. 24, 1964

3,126,542
CONICAL SCANNING RADAR DATA
PROCESSING SYSTEM
Roy George Knutson, Santa Ana, and James C. Elms,
Newport Beach, Calif., assignors to North American
Aviation, Inc.
Filed Jan. 23, 1962, Ser. No. 168,279
9 Claims. (Cl. 343—16)

This invention relates to a data processing system for conical scanning radar and more particularly concerns apparatus which will allow a conical scanning radar to provide a variety of special functions not heretofore available from such a system.

With the successful development and operation of monopulse techniques, a number of special functions have become available from airborne radars. These functions include terrain clearance (information concerning distance of the aircraft above the ground at a point ahead of the aircraft), azimuth beam sharpening (for purposes of ground mapping) and air to ground slant range measurement. The accomplishment of these functions has been realized to a highly satisfactory degree utilizing a monopulse radar. A large class of radars exists which are known as conical scanning radars. The realization of the special functions set forth above with the use of conical scanning radars has been obtained only imperfectly, if at all, in the past. Accordingly, it is an object of this invention to enable a conical scanning radar to have the same general capabilities as monopulse radar in producing certain special functions.

In carrying out the principles of this invention in accordance with a preferred embodiment thereof, there is provided a data processing system which operates in cooperation with a substantially conventional conical scanning radar to provide a synthesis of video patterns which are equivalent to patterns produced by a monopulse radar. The radar system trigger is synchronized from the conical scan of the antenna so that pulses are transmitted at predetermined points in the conical scan. These points at which the pulses are transmitted are particularly chosen to be symmetrically disposed about a predetermined plane containing the axis of scan. Video received from pulses transmitted at such specified points is received from different directions in space and is combined additively and differentially to obtain synthetic monopulse sum and difference signals.

For a terrain clearance function wherein angular information in a vertical plane is desired, points of transmission of pulses are chosen which are mutually spaced by 180 degrees in the antenna scan and both of which lie in a vertical plane so that the information employed in the data processing is that obtained at the uppermost and lowermost antenna pattern positions.

Where azimuth beam sharpening is desired, the system is caused to transmit pulses at diametrically opposed points lying in a substantially horizontal plane containing the axis of scan. Video return resulting from the two transmitted pulses are both additively and differentially combined to provide monopulse-type sum and difference signals. The monopulse-type sum and difference signals are differentially combined to provide for beam sharpening.

Figure 2:
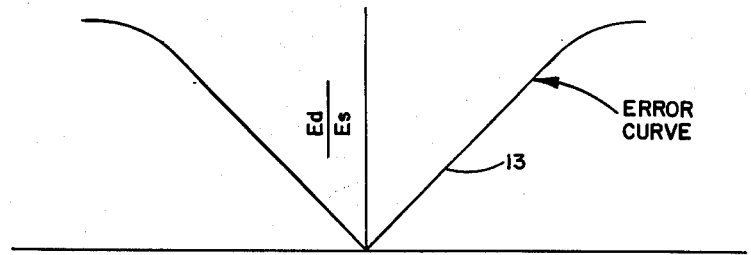
Figure 8:
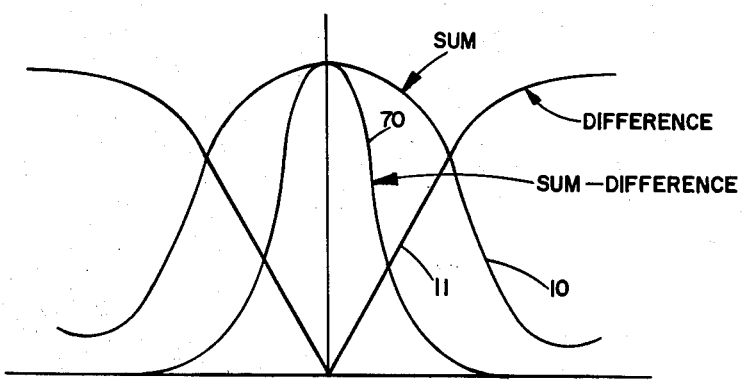
Figure 3:
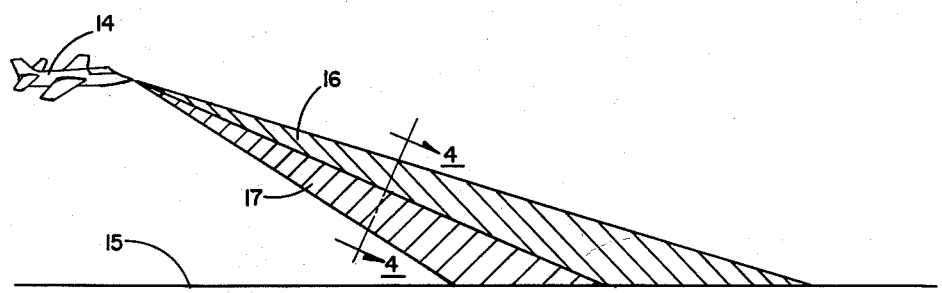
Figure 4:
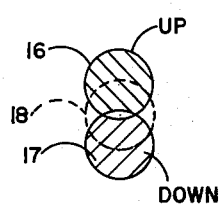
Figure 5:
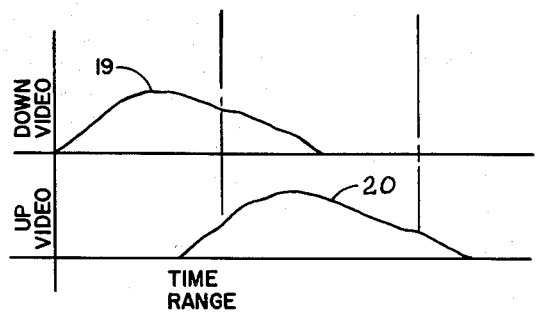
Figure 6:
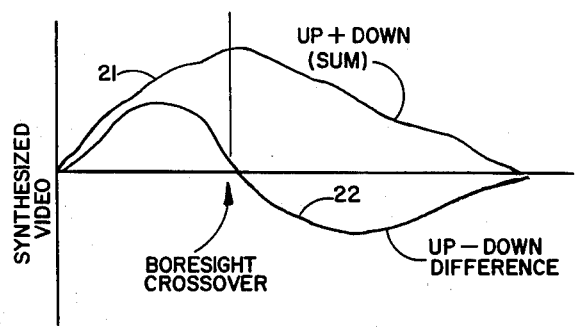
Figure 7:
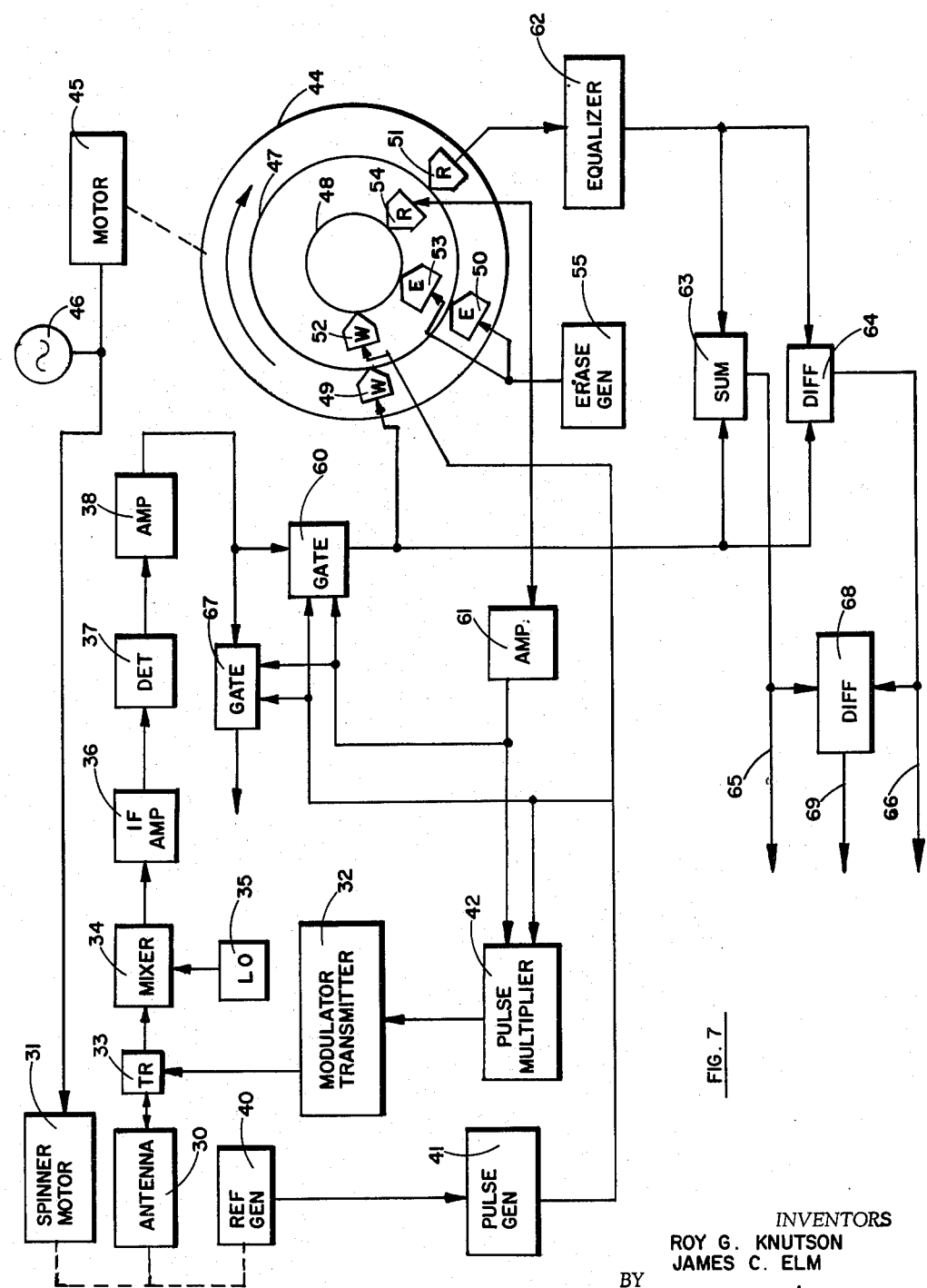

Thus further objects of this invention include the provision of a modified conical scanning radar capable of producing monopulse-type signals, and the provision of a modified conical scanning radar which provides information capable of use for terrain avoidance, beam sharpening, and air-to-ground slant ranging. These and other objects of the invention will become apparent from the following description taken in connection with the accompanying drawings, in which:

FIGS. 1 and 2 illustrate certain waveforms typical of a monopulse system;
FIGS. 3 and 4 illustrate a typical conical scanning radar beam;
FIG. 5 illustrates video return from a conical scanning radar;
FIG. 6 depicts the video obtained from the data processing system of the present invention;
FIG. 7 comprises a block diagram of an embodiment of the invention; and
FIG. 8 illustrates waveforms employed in the data processing for beam sharpening.

In the drawings like reference numerals refer to like parts.

Since an object of this invention is the synthesis of certain features of monopulse radar video by a data processing operation upon a conical scanning radar, it is helpful to initially point out certain basic aspects of a monopulse system. The monopulse radar system, also known as a simultaneous lobing system, transmits and receives energy in at least one pair of antenna lobes symmetrically displaced about the boresight axis of the antenna. Generally there is provided one pair of such lobes mutually displaced in each plane in which angular information is to be obtained. Signals received in the antenna lobes of any given pair are compared to provide one signal known as the sum or range signal and a second signal known as a difference or error signal. In sum and difference type monopulse radar the energy in the two antenna lobes is additively combined to provide the sum signal which is handled by a sum channel of the radar and is also differentially (subtractively) combined to provide the error signal handled by the error channel of the system. For a typical monopulse system, the sum channel signal, as illustrated at 10 in FIG. 1, has a maximum amplitude for returns from targets exactly on the boresight. The error signal 11 has a null or crossover point which occurs for returns from those targets exactly on the boresight axis. The error signal increases in magnitude for returns from targets on either side of the boresight axis and in direct proportion, for a limited angle, to the angle B of the target from the boresight. A characteristic of a monopulse radar using amplitude comparison techniques is that the ratio of the sum and difference signals is a direct function of the angle of arrival of the returned pulse as indicated by $$\frac{E_d}{E_s} = KB$$

where $E_d$ represents the difference signal, $E_s$ represents the sum signal, and K is a constant. It is this characteristic of the received monopulse information which permits terrain clearance information and other special functions to be derived.

Illustrated in FIG. 2 is a curve 13 of the ratio of difference to sum signals showing the linearity of the error signal ratio for limited angles off boresight. It may be noted that the sense of the angle off boresight is generally detected in a monopulse radar by phase comparison of sum and error signals. Amplitude envelopes of intermediate frequency signals are depicted in FIGS. 1 and 2. The error signal has one phase relative to the sum signals for targets on one side of the boresight and has the opposite phase relative to the sum signal for targets on the other side of the boresight.

As illustrated in FIGS. 3 and 4, an airborne conical scanning radar is carried in a vehicle 14 and directed toward the ground 15 at a small depression angle with respect to the flight path. The radar beam is scanned through a pattern indicated at 16, 17. In the conical scan, as is well known, the boresight axis of the antenna is rotated about an axis of rotation which is angularly displaced from the boresight so that the boresight will trace a circular path indicated at 18 in FIG. 4. For terrain clearance, information in a vertical plane is required. Accordingly, there is employed information obtained when the antenna is in its lowermost and uppermost positions indicated at 16 and 17. If the video return which is received at the time when the beam is in the up position is recorded on a video recording device and is then added to and also subtracted from the video received when the beam is in the down position, a video pattern equivalent to the sum and difference signals from an elevation monopulse radar can be generated. FIG. 5 illustrates the video received from ground illuminated at two successive points in the conical scan cycle. Curve 19 represents the conical scan video return with the antenna pattern in down position as indicated at 17 while curve 20 indicates the video return received with the antenna pattern in up position as indicated at 16 of FIG. 3. By means of the data processing system of the present invention, curves such as 19 and 20 are additively combined to provide the synthetic sum signal indicated at 21 of FIG. 6 and are also subtractively combined to provide the synthetic error signal 22 of FIG. 6. It will be seen that the synthetic error signal 22 is of the same polarity as the sum signal on one side of the boresight (which is represented by the error signal crossover point) and is of polarity opposite that of the sum signal for video returns from targets on the other side of the crossover point. As in the monopulse error signal the null or crossover point represents, in this synthetic video, a synthetic boresight. Such synthetic boresight may be defined as a line bisecting the angle between the antenna boresight when in up position and when in down position.

Illustrated in FIG. 7 is a preferred embodiment of a particular apparatus for providing up and down signals such as illustrated at 19 and 20 and also for combining them, as illustrated in FIG. 6.

The apparatus illustrated in FIG. 7 comprises a substantially conventional conical scan radar which is modified so as to provide for retention of video information for a sufficient number of interpulse periods to permit comparison of signals received from at least two directions in space. For terrain clearance mode of operation, video from ground return is stored for the amount of time required for the conical scan antenna to rotate through 180 degrees. Video from the two diametrically opposed positions in the antenna scan is then combined to give an overall effective antenna pattern which is equivalent to a monopulse pattern. By storing the video for the amount of time required for the antenna to move from up to down or down to up position, it is possible to obtain the effect of video from two directions simultaneously. The effective simultaneous returns are then processed to give sum and difference returns, as illustrated in FIG. 6. These monopulse type sum and difference signals then may be utilized in a suitable terrain avoidance or terrain clearance computer circuit such as that described, for example, in a U.S. patent application Serial No. 830,675 of W. E. Stoney for Terrain Clearance Radar, filed July 30, 1959. Such terrain clearance circuits will operate on the sum and difference video voltages obtained from the video storage and combining circuits to derive terrain clearance warning video for a suitable indicator circuit. To make certain that pulses are transmitted at the particularly predetermined points of the scan of the antenna, that is, when the antenna pattern is in the up and down position in a vertical plane for terrain avoidance, suitable synchronizing circuits are employed which key the transmitted pulses to the position of the scan mechanism.

As illustrated in FIG. 7 a substantially conventional conical scan radar includes an antenna 30 together with a spinner motor 31 therefor of conventional type such as, for example, more particularly described in an application Serial No. 606,509 for Radiant Energy Scanner filed August 29, 1956 by Robert M. Ashby, now abandoned. U.S. Patent No. 2,878,466 illustrates another type of well known conical scan radar. The motor 31 effects rotation of the antenna or of the antenna pattern about an axis which is angularly displaced from the axis of the antenna boresight. A triggered modulator transmitter 32 responds to each trigger input thereto by providing a pulse of radio frequency energy to the antenna by means of duplexing or transmit-receive apparatus 33. Echoes of transmitted energy pulses are received by the antenna and fed through the duplexing apparatus to a mixer 34 wherein the signals are combined with a suitable signal from a local oscillator 35. The output of mixer 34 is thence fed via an intermediate frequency amplifier 36 to a video detector 37 and video amplifier 38 all in a conventional manner known to those skilled in the art.

For the purposes of this invention, it is desired that energy pulses be transmitted at predetermined points in the antenna pattern scan. For terrain clearance operation, as previously described, the pulses must be transmitted at the uppermost and lowermost points in the antenna pattern scan respectively. Accordingly, there is provided a reference generator 40 which is driven from the spinner motor in synchronism with the antenna scan. This reference generator may be any suitable position pickoff such as, for example, a conventional synchro providing a sinusoidal output signal which is fed to a pulse generator 41 so as to provide a single reference pulse which occurs just when the antenna pattern is in one of the two positions at which it is desired to transmit. With a sinusoidal output of reference generator 40, the pulse generator may comprise conventional amplification, clipping, and differentiating circuitry for producing and selecting a single pulse in coincidence with the up position of the antenna pattern scan.

The output of pulse generator 41 is fed to trigger a pulse multiplier 42 which is arranged to provide two or more output pulses for each input pulse thereto. The pulse multiplier 42 also receives a second input comprising a pulse which occurs exactly when the antenna is in the down position as will be more particularly described hereinafter. Accordingly, the output of the pulse multiplier will comprise one externally triggered pulse when the antenna is in up position and one such pulse when the antenna is in down position together with one or more pulses following each such externally triggered pulse. The output of the pulse multiplier 42 comprises the system trigger which is fed to the transmitter modulator 32.

While optical methods of video storage may be employed for the purpose of the present invention, there is illustrated, in FIG. 7, a storage device comprising a magnetic disc 44 of the type more particularly described in U.S. Patent No. 2,933,724 of R. M. Ashby for Magnetic Recording Data Analyzer. The storage disc 44 is driven by a motor 45. Both of motors 31 and 45 are synchronous motors energized from a common source 46 to provide for precise synchronization of antenna scan and disc rotation. The disc includes an information storage channel 47 together with a synch pulse channel 48. The information channel 47 is provided with a write head 49, an erase head 50 and a read head 51 while the sync channel 48 is provided with a write head 52, an erase head 53 and a read head 54.

The narrow pulse from generator 41 which is produced at the time in the scan cycle at which the radar beam is in uppermost position is fed to sync write head 52 to be recorded upon the sync channel 48 of the recorder disc 44. As previously noted this same pulse is employed to trigger the transmitter so that video return comprising a reflection of energy of the pulse transmitted in up position is fed from video amplifier 38 through a gate 60 to be written into the information channel by means of write head 49. The size of the disc is such, in relation to its speed of rotation, that the received video trace written by write head 49 is recorded on a small portion of the total available channel length. Further the speed of the disc is such that it makes less than one complete revolution in the time required for the antenna pattern to move 180 degrees. Consequently, by proper positioning of the sync channel read head 54 at a predetermined angular distance from the sync pulse write head 52 a pulse can be generated from read head 54 at a time subsequent to the initial up position scan synchronizer pulse which is exactly equal to one half of the scan period. This pulse may be utilized to trigger the transmitter at a time when the antenna beam is exactly in down position. Accordingly, the output of sync pulse read head 54 is fed through an amplifier 61 to the second input of the pulse multiplier 42.

The information read head 51 is angularly spaced from information write head 49 by exactly the same angle which separates sync write head 52 from sync read head 54. Consequently, read head 51 will pick up the previously recorded video (recorded when the antenna was in up position) at the same time that the video amplifier provides the return video received from the antenna in down position. Thus whenever read head 51 is reading up position video, the video amplifier 38 is providing down position video and vice versa. Via an equalizer 62 which compensates for nonlinearities in the response of read head 51, the video which has been delayed for one half a scan period by means of the recorder, is fed to a summing network 63 and a difference network 64. Here the delayed video is compared with the nondelayed video received directly from the video amplifier 38 through the gate 60. Thus it will be seen that as the video from one pulse is being recorded on the disc, the video from the pulse corresponding to beam position 180 degrees away is being read from the disc. Both received and delayed video are applied simultaneously to the sum and difference circuits to obtain the monopulse-type sum and error signals which appear at leads 65 and 66 respectively.

Since the data processing system described herein employs pulses transmitted only at two points of the antenna scan, provision is made for using the conical scan radar in conventional fashion during time intervals between such predetermined spaced pulses. For this reason the pulse multiplier 42 is provided to effect the transmission of at least two or more pulses during each scan period in addition to those transmitted in the up and down positions. Where such additional transmitted pulses are employed, it is necessary to select for the data processing only that information related to information received from the two predetermined directions in space, namely, from the antenna in up position and from the antenna in down position. To this end, the output of video amplifier 38 is momentarily gated by means of gate 60 to the write head 49 and to the sum and difference networks 63 and 64. Gate 60, normally disabled, is momentarily enabled by each of the up and down pulses from pulse generator 41 and read head 54 (via amplifier 61) respectively. Accordingly, the output of the conical scanning radar from video amplifier 38 is available for conventional use except during periods immediately following the up and down transmitted pulses. Thus for use of the output of amplifier 38 in a conventional manner, the received video is fed through a normally open gate 67 which is momentarily disabled by means of inputs received from the pulse generator 41 and the sync pulse read head 54.

Erase heads 50 and 53 are positioned between the read heads so that the video pulse and sync pulses are removed prior to the initiating of the next transmit cycle of radar.

It is obvious from the apparatus described above, that the same type of data processing may be provided employing left and right positions of the conical scan beam. Such left and right positions would comprise points diametrically opposed lying in a substantially horizontal plane containing the axis of the antenna scan pattern. Selection of the particular point or points of the antenna scan pattern is achieved by appropriate adjustment of the reference generator relative to the antenna scan motion.

Whether up and down or left/right positions of the antenna scan are used, a type of beam sharpening similar to that known as monopulse resolution improvement is obtained by employing a second difference circuit 68 which operates to subtract the error or difference signal 66 from the sum signal 65 to provide a beam sharpened output 69 as illustrated in connection with FIG. 8. As illustrated in FIG. 8, subtraction of the error signal 11 from the sum signal 10 results in a sharpened signal 70 of considerably improved resolution which sharply peaks at the center of the conical scan.

With reference to FIG. 6 it will be seen that the synthetic monopulse pattern derived in accordance with the described data processing system can also be utilized for air to ground slant ranging in the manner described in a co-pending application of W. S. Burdic et al., Serial No. 19,959 for Slant Range Tracking Terrain Avoidance System, filed April 4, 1960. As can be seen from FIG. 6, the error signal crossover point, the point at which the difference pattern crosses the horizontal axis, occurs along the boresight axis of the conical scan. This point therefore can be tracked with a suitable range tracking computer to produce a signal representing the slant range to the ground along the boresight axis in substantially the same manner as for a monopulse radar.

With the incorporation in a conical scanning radar of the described video storage device, it is possible to provide a moving target indication with little added overall complexity. Such a moving target indication may be provided as described in the above-mentioned Patent No. 2,933,724 of Robert M. Ashby wherein stored video is subtracted from the next video return, resulting in the partial cancellation of fixed targets but retaining video information on moving targets.

It will be seen that there has been described a system for producing special functions from a conical scan radar by means of synthesis of monopulse beam patterns in the video channel of the radar. This synthesis is accomplished through the use of a video memory device by means of which it is possible to compare the video return received when the beam is in up position with a return received when the beam is in down position. Further, left and right positions of the beam can also be compared. The concepts of the invention, accordingly, comprise a data processing system employing a video memory device which can be synchronized with the scan motion of a conventional conical scan radar and which will provide a means for comparing two pulses received at points symmetrically disposed about a predetermined plane containing the axis of scan so as to permit derivation of special functions such as terrain clearance, beam sharpening, and air-to-ground ranging.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In an energy transmitting and receiving system having an energy transducer with a conically scanning radiation pattern, means for receiving signals from said transducer at first and second points in the scan which are mutually spaced by 180 degrees, means for effecting a relative delay of signals received at said first and second points substantially equal to half the scan period, and means for combining said relatively delayed signals.

2. An energy transmitting and receiving system comprising a transducer having a conically scanning radiation pattern, means responsive to said transducer for producing first and second signals respectively representing energy receiving by said transducer at first and second points symmetrically disposed about a predetermined plane containing the axis of scan, and means for combining said signals comprising means for adding said signals to provide a sum signal and means for subtracting one of said signals from the other to provide an error signal.

3. The system of claim 2 including means for subtracting said error signal from said sum signal.

4. In a transmitting and receiving radar system having an antenna with a conically scanning radiation pattern, means for transmitting and receiving signals from said antenna at points in the scan which are diametrically opposed in a vertical plane, means for effecting a relative delay of signals received at said first and second points substantially equal to half the scan period, and means for combining said relatively delayed signals.

5. A radar system comprising an antenna having a conically scanning radiation pattern, means synchronized from the scanning of said pattern for transmitting pulses at first and second diametrically opposed points in the pattern scan, means responsive to said antenna for producing first and second signals respectively representing echoes of pulses transmitted at said points, means for effecting a relative delay of signals corresponding to said first and second points for a period substantially equal to half the period of said scan, and means for combining said relatively delayed signals additively and subtractively.

6. In a conical scan radar, an antenna, drive means for effecting a conical scan of the radiation pattern of the antenna, a recorder synchronized with said drive means, a pulse generator responsive to the scanning antenna radiation pattern for generating a sync pulse at a selected point of the antenna scan, means for writing said sync pulse into said recorder, a receiver responsive to said antenna, means responsive to the receiver for writing received signals into said recorder, means for reading said recorder sync pulse from said recorder after an interval equal to half the period of said conical scan, a transmitter coupled with said antenna and having trigger inputs from said pulse generator and from said sync pulse reading means, second reading means for reading recorded received signals from said recorder when said sync pulse is read by said first reading means, means for additively combining the outputs of said receiver and said second reading means to produce a sum signal, and means for differentially combining the outputs of said receiver and said second reading means to produce a difference signal.

7. The radar of claim 6 including means for differentially combining said sum and difference signals to produce a beam sharpening signal.

8. In a conical scan radar, a transmitter, an antenna, drive means for effecting a conical scan of the radiation pattern of the antenna, a recorder synchronized with said drive means, a pulse generator responsive to the scanning antenna radiation pattern for generating a sync pulse when the antenna scan is in its uppermost position, means for writing said sync pulse into said recorder, a receiver responsive to said antenna, means responsive to the receiver for writing received signals into said recorder, a gate interposed between said receiver and said last mentioned writing means and having a first gate enabling input from said pulse generator, means for reading said recorder sync pulse from said recorder after an interval equal to half the period of the conical scan, said gate having a second gate enabling input from said reading means, a system trigger generator having trigger inputs from said pulse generator and from said reading means, a triggering connection from said system trigger generator to said transmitter, second reading means for reading recorded received signals from said recorder when said sync pulse is read by said first reading means, an equalizer responsive to said second reading means, means for additively combining the outputs of said receiver and equalizer to produce a sum signal, and means for differentially combining the outputs of said receiver and equalizer to produce a difference signal.

9. The radar of claim 8 wherein said system trigger generator includes a pulse multiplier for providing a number of output trigger pulses to said transmitter for each trigger input, said gate also being interposed between said receiver and both said first and second combining means.

References Cited in the file of this patent

UNITED STATES PATENTS 2,449,517     Stout et al. _____ Sept. 14, 1948